United States Patent [19]

Rossi

[11] Patent Number: 5,504,298

[45] Date of Patent: Apr. 2, 1996

[54] METHODS AND APPARATUS FOR DETECTING ELECTRODE SEPARATION

[75] Inventor: Alessandro Rossi, Florence, Italy

[73] Assignee: Axis USA, Inc., Tampa, Fla.

[21] Appl. No.: 72,581

[22] Filed: Jun. 4, 1993

[51] Int. Cl.$^6$ .................................................. B23K 11/25
[52] U.S. Cl. ........................................ 219/109; 219/86.51
[58] Field of Search .................................. 219/109, 86.41, 219/86.51, 110; 364/550

[56] References Cited

U.S. PATENT DOCUMENTS

| | | |
|---|---|---|
| 3,727,822 | 4/1973 | Umbaugh . |
| 4,001,539 | 1/1977 | Franchi et al. . |
| 4,419,558 | 12/1983 | Stiebel . |
| 4,447,700 | 5/1984 | Cohen . |
| 4,484,056 | 11/1984 | Rossell . |
| 4,562,330 | 12/1985 | Hamilton . |
| 4,734,556 | 3/1988 | Namiki . |
| 4,876,431 | 10/1989 | Livingston . |
| 4,973,815 | 11/1990 | Ito et al. . |
| 4,984,171 | 1/1991 | Tsujii ................................... 219/86.41 |
| 5,057,661 | 10/1991 | Banner . |
| 5,063,279 | 11/1991 | Rossi . |
| 5,072,090 | 12/1991 | Morita . |
| 5,111,015 | 5/1992 | Riordan . |
| 5,122,975 | 6/1992 | Luciani et al. ........................... 364/550 |
| 5,138,127 | 8/1992 | Fries et al. . |
| 5,225,647 | 7/1993 | Dufrenne ................................ 219/109 |

FOREIGN PATENT DOCUMENTS

0307442  3/1989  European Pat. Off. .

*Primary Examiner*—Clifford C. Shaw
*Attorney, Agent, or Firm*—Fish & Neave; Robert R. Jackson; Robert W. Morris

[57] ABSTRACT

Methods and apparatus for identifying the occurrence of fusing electrical attachment during fusing operations are provided. After a conventional fusing operation is complete, an electrical signal is applied to the fusing electrode while the fusing electrode is returned to its home position. The electrical signal is monitored to determine whether a circuit path exists from the fusing electrode through the fused conductors to the ground electrode. The presence of a path would indicate that the fusing electrode has become attached to the fused conductors. An alternate embodiment is also described in which the force required to withdraw the fusing electrode is monitored while the electrode is returned to its home position. If the measured force does not fall within predetermined limits, or if the measured force varies during electrode movement, fusing electrode attachment has occurred.

71 Claims, 3 Drawing Sheets

METHODS AND APPARATUS FOR
DETECTING ELECTRODE SEPARATION

BACKGROUND OF THE INVENTION

This invention relates to electrical connection fusing machines, and more particularly to machines for fusing the coil wires of an electric motor and insuring that the fusing electrode does not remain attached to the electrical conductor after completion of the fusing operation.

Fusing machines are widely used for fusing armature wires to commutator tangs or slots, and stator wires to terminal board contact hooks, of electric motors. A typical armature fusing operation, for example, involves applying a physical force from the fusing electrode to the tang or slot being fused. Next, current is applied to the fusing electrode, which current passes through the commutator to a ground electrode. The resistance of the fusing electrode is higher than that of the commutator, causing the fusing electrode to heat. The heat is thermally transferred to the point of contact between the fusing electrode and the commutator. A similar set of steps is required for stator fusing operations.

Assuming that the fusing process is successfully completed, a reset step is performed wherein the fusing electrode is removed from the electrical conductors and returned to its home position for the next fusing operation. However, various problems can occur during the previously described application of current and heating which may cause the fusing electrode to remain attached to the fused electrical conductors. For example, an excessively worn electrode tip may cause an uneven application of heat which can result in "hot spots" (i.e., excessive application of heat in specific locations) leading to attachment of the electrode. Alternatively, if precise control of the physical and electrical phases of the fusing operation is not maintained, attachment may occur from the application of excess heat.

An apparatus for precise control of the physical phases of the fusing operation is described in Rossi U.S. Pat. No. 5,063,279, entitled "Methods and Apparatus for Fusing Armature and Stator Wires," which is hereby incorporated by reference in its entirety. The application of force from the fusing electrode to the commutator bar (or terminal board) and wires is performed according to predetermined force or displacement functions.

An apparatus for precise control of the electrical phases of the fusing operation is described in applicant's co-pending, commonly-assigned application Ser. No. 07/903,910, filed Jun. 25, 1992, now U.S. Pat. No. 5,300,753, entitled "Methods and Apparatus for Fusing Electrical Conductors," which is hereby incorporated by reference in its entirety. In application Ser. No. 07/903,910, now U.S. Pat. No. 5,300,753, a precise, timed, and controlled delivery of electric current to the fusing electrode of a fusing machine based on predetermined fusing profiles is described. In addition, the delivery of electric current is synchronized with the various phases of the application of force or displacement functions described in U.S. Pat. No. 5,063,279. By synchronizing precise control of the physical and electrical phases of the fusing operation, cohesion joints of increased quality are produced, while the occurrences of electrode attachment are reduced.

It is also possible for a typical fusing operation to utilize heat which is generated via means other than by passing a current through an electrode. For example, ultrasonics may be used to create heat through vibration or heat may be supplied via an external flame. Irrespective of the heat source, fusing operations require that force be applied to the workpiece in conjunction with the heat to form the cohesion joint. And, as previously described, the combination of heat and force may cause the force applying member to become attached to the conductors no matter what the heat source is.

If the fusing electrode (or merely the force producing member) does remain attached to the electrical conductors during the reset step, the movement of the fusing electrode may cause weakening of the cohesion joint between the electrical conductors. In a worst case situation, the weakening can be so severe that it may actually cause the fused joint to break. It is readily apparent that any weakened or broken cohesion joints need to be identified before the damaged parts are incorporated into complete electric machines. Traditional methods for identification require carrying out a destructive test (commonly known as a "click test") which, due to the destructive nature of the test, can only be performed on a statistical basis. Statistically discovered problems will only appear after a significant number of sub-standard products have been produced, and as such, may eventually cause more severe problems due to the progressive nature of fusing operation malfunctions.

Therefore, using traditional identification methods, incorporation of damaged components is likely to occur. Such incorporation will, at a minimum, significantly increase manufacturing costs because: (1) broken parts will not be immediately identified and further downstream assembly costs will be wasted on defective components; and (2) problems with the fusing process will continue and probably worsen, affecting additional components until the problems are properly identified. Possibly even more significant is the fact that damaged cohesion joints may unknowingly be incorporated into finished products, resulting in reduced quality of the completed electric motors.

In an effort to try to achieve high quality fusing, time consuming and complex operations must be undertaken to set up the fusing machine, as well as increased inspections on the fusing components to ensure that worn components are quickly replaced. Such operations could be avoided if a fusing machine could precisely apply various levels of current at the proper time throughout the fusing operation and if a fusing machine could immediately identify fusing electrode attachment. Electrode attachment could be used to signal an operator to intervene and inspect the fusing components. Electrode attachment could also be used to automatically reject the component that was attached to the electrode to prevent its incorporation into a final product, thereby increasing the overall quality of the manufacturing operation. Additionally, the fact that electrode attachment occurred could provide feedback to the previously described precision control systems which would immediately change the fusing parameters to avoid attachment in any additional operations.

It would therefore be desirable to provide a fusing machine which identifies the occurrence of fusing electrode attachment during fusing operations. It would also be desirable to provide a fusing machine which modifies the parameters for precise control of the fusing operation in response to the identification of electrode attachment to produce more reliable cohesion joints during fusing operations. It would also be desirable to provide a fusing machine which does not require constant inspection of the fusing components. It would still further be desirable to provide a fusing machine which automatically rejects components for which electrode attachment is identified.

SUMMARY OF THE INVENTION

In view of the foregoing, it is an object of this invention to provide an improved fusing machine that identifies the occurrence of fusing electrode attachment during fusing operations.

It is a further object of this invention to provide an improved fusing machine which modifies the parameters for precise control of the fusing operation in response to the identification of electrode attachment and therefore produces more reliable cohesion joints during fusing operations.

It is another object of this invention to provide an improved fusing machine which does not require constant inspection of the fusing components.

It yet another object of this invention to provide a fusing machine which automatically rejects components for which electrode attachment is identified.

These and other objects of the invention are accomplished in accordance with the principles of the invention by providing an improved fusing machine having regulation and control circuitry which identifies attachment of a fusing electrode to electrical conductors during fusing operations. The control circuitry may operate by applying a detection control signal to the fusing electrode while monitoring the displacement of the fusing electrode. When the detection signal varies, the displacement is identified, and if it falls within acceptable limits, normal operation continues, otherwise an interruption occurs. If the electrode has been retracted to its home position (as indicated by the displacement) and no change in detection signal has occurred, the electrode is still attached to the electrical conductors and appropriate action may be taken. The control circuitry will delay monitoring the detection control signal because there will normally be at least a minor deformation release of the tang which may cause it to remain in contact with the electrode even when no attachment exists. This delay may be based on a predetermined displacement of the electrode, or it may be based on a predetermined time after the start of the electrode withdrawal phase.

Alternatively, the fusing machine may operate by utilizing pressure transducers on the fusing electrode while monitoring the displacement of the fusing electrode (instead of using a detection control signal). In this case, when the electrode has been successfully retracted to its home position (as indicated by the displacement), essentially no change in value of the signal from the pressure transducers should have occurred. If a significant change has occurred, the electrode has not been released from the electrical conductors. Also, the control circuitry can monitor the pressure transducer signal to determine the exact displacement when contact between the electrode and the electrical conductors ceased (because, as described above, there will normally be at least a minor deformation release of the tang which will cause it to remain in contact with the electrode even when no attachment exists).

The fusing machine includes the capability to modify parameters for current, voltage, power, energy, displacement, or force regulation of the control circuit whenever electrode attachment occurs. This modification capability enables the fusing machine to produce more reliable cohesion joints during fusing operations by immediately compensating for varying operating conditions. In addition, the ability to modify parameters during operation reduces the need for inspection of fusing components, especially, the fusing electrode. As the fusing electrode wears, the fusing machine will automatically compensate for the wear, thereby enabling more reliable cohesion joints to be formed from a single fusing electrode.

The fusing machine may further include control circuitry to automatically identify and reject components for which electrode attachment occurred. This capability limits the introduction of non-standard components to final assembly of the electric machines to help reduce overall manufacturing costs. Additionally, this capability helps exclude marginal components, that otherwise might not be detected from traditional inspection, from being incorporated into final products. These marginal components may perform adequately at first, but the weakened cohesion joints may cause the final product to fail with a reduced amount of operational time.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
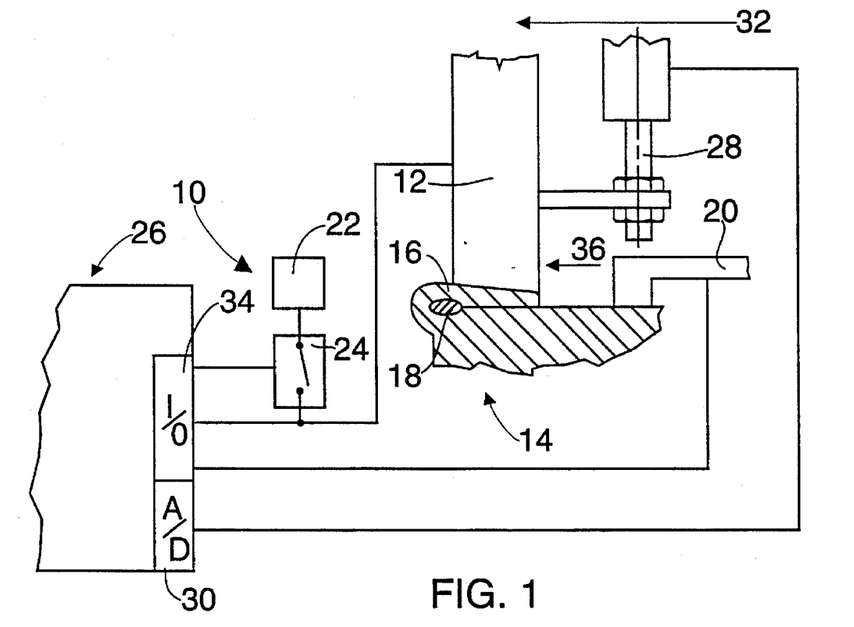
FIG. 1 is a schematic block diagram of an illustrative embodiment of the present invention.

FIG. 1 shows a schematic block diagram of detection circuit 10 of the present invention. In FIG. 1, detection circuit 10 is used to detect and identify when fusing electrode 12 has become attached to fused electrical conductors 14, which includes commutator tang 16 and wire 18. As in conventional fusing operations, fusing occurs by passing a current from fusing electrode 12 through conductor 14 to ground electrode 20. This current causes fusing electrode 12 to heat (due to the high resistance of the fusing electrode) and the heat is thermally transferred to electrical conductors 14. Physical force is also applied by fusing electrode 12 to form the cohesion joint between the electrical conductors 14. A detailed description of the precise control of physical and electrical phases is described in previously identified U.S. Pat. No. 5,063,279 and U.S. patent application Ser. No. 07/903,910, filed Jun. 25, 1992, now U.S. Pat. No. 5,300,753.

Detection circuit 10 also includes a conventional voltage source 22 which is used to supply a detection signal to fusing electrode 12. Voltage source 22 is connected to the input of a switch 24 which regulates when the detection signal is applied to fusing electrode 12. Switch 24 is also connected, via input-output card 34, to control system 26 which controls the state of switch 24 (i.e., conducting or non-conducting). Typically, ground electrode 20 is connected to a return terminal (not shown) of voltage source 22, and is also connected to control system 26, although this connection may be made via any other means in contact with conductors 14. A resistive element (not shown) may be connected between source 22 and switch 24, or wherever is most convenient, to provide a load when short circuits occur between the terminals of source 22 to protect source 22. Any other conventional means of protecting source 22 may also be used (e.g., source 22 may itself be constructed to withstand short circuits so that external protection is not required). Control system 26 is also connected to the output of switch 24 in order to monitor potential difference between the detection signals on electrodes 12 and 20.

An additional component of detection circuit 10 is position transducer 28 which is also connected to control system 26. This connection may be made to an analog-to-digital card 30 within control circuit 26. Position transducer 28 monitors the location of electrode 12 in order to at least identify when electrode 12 has reached testing position 36 and home position 32 (shown at an exaggerated distance from tang 16 for clarity). Position transducer 28 may continuously monitor the position of electrode 12, as may be required by detection system 10. The operation of the overall system will be apparent from the description of FIG. 2.

Figure 2:
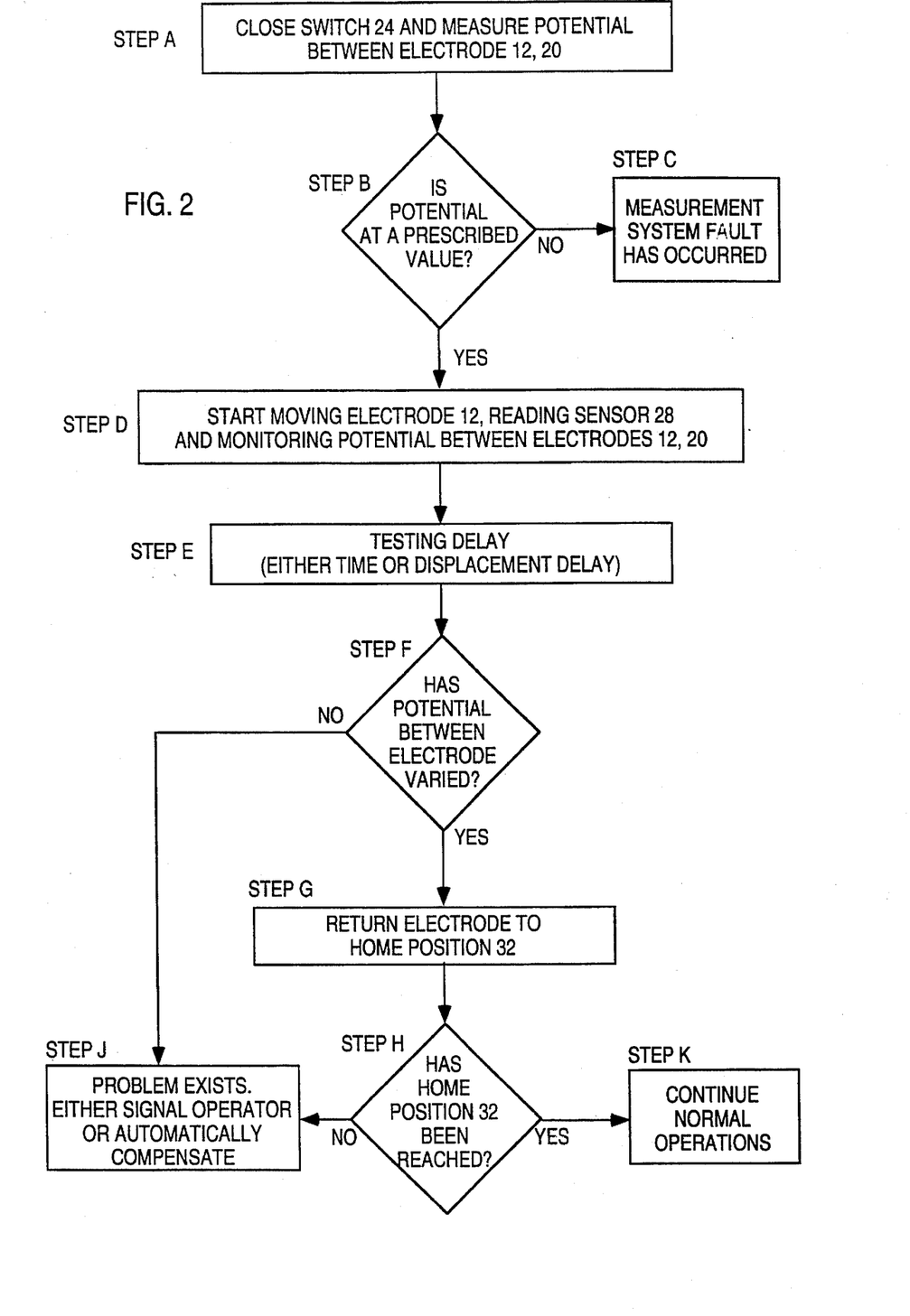
FIG. 2 is a block diagram showing the sequence of operations for the embodiment of the present invention shown in FIG. 1.

FIG. 2 is a block diagram showing a representative example of the control steps required for detection of electrode attachment using the apparatus described in connection with FIG. 1. Once control circuit 26 has determined that the fusing of electrical conductors 14 is complete (the determination may include a delay to permit the workpiece to cool, and therefore reduce the possibility of electrode attachment), switch 24 is closed to supply the detection signal to electrode 12 (and to control system 26) and the potential between electrodes 12 and 20 is measured (step A). If the potential is not at a prescribed value (step B), a system fault is triggered to indicate that a system malfunction exists (step C). Control system 26 then begins the conventional sequence required to move electrode 12 to home position 32, and at the same time, begins reading position transducer 28 (step D).

Control system 26 may also implement a delay sequence, as needed, to account for deformation release (i.e., the tendency for the fused conductors to marginally move toward their original pre-deformed position) or other various parameters (step E). The delay may be a displacement delay, where control system does not begin testing until a certain displacement is achieved, or it may be a simple time delay, where testing does not being until after a predetermined time period occurs. At a minimum, in either case, the delay sequence will place the electrode at a displacement (i.e., testing position 36 as shown in FIG. 1) where the electrode should no longer be in contact with the conductors and no damage to the cohesion joint will have occurred even if contact still exists.

Once the delay sequence is complete, control system 26 determines whether the potential between electrodes 12 and 20 has varied (step F). If the potential has not varied, electrode 12 must be attached to conductors 14, therefore control is transferred to the problem resolution sequence (step J). If the potential has varied, electrode detachment has successfully occurred and the sequence to return electrode 12 to home position 32 is completed (step G). Control system 26 then compares the value of position transducer 28 to home position 32 to ensure that home position 32 has been reached (step H). If home position 32 is reached, normal operations may continue with the next workpiece (step K), otherwise control is transferred to problem resolution (step J).

It is important to note that step F occurs while electrode 12 is moving and therefore control system 26 is programmed to recognize essentially instantaneous variations in potential because they fall within the interrupt limits of control system 26. Rapid identification of electrode attachment is critical to protecting the cohesion joint formed during fusing. As an attached electrode attempts to move away from the fused conductors, it will tend to pull apart the cohesion joint causing it to weaken. In the worst case situation, where the attached electrode is permitted to return to home position, the attached electrode may even rip the workpiece apart.

Control system 26 may perform problem resolution by simply pausing and signaling an operator, or system 26 may attempt to automatically compensate for electrode attachment by adjusting the various parameters involved in fusing operations (e.g., energy delivery or force). If automatic compensation is attempted and attachment continues to occur, control system 26 will cease operation and signal an operator for intervention. Control system 26 may even restart the fusing cycle to refuse the attached workpiece in an effort to detach the electrode without damaging the workpiece.

Figure 3:
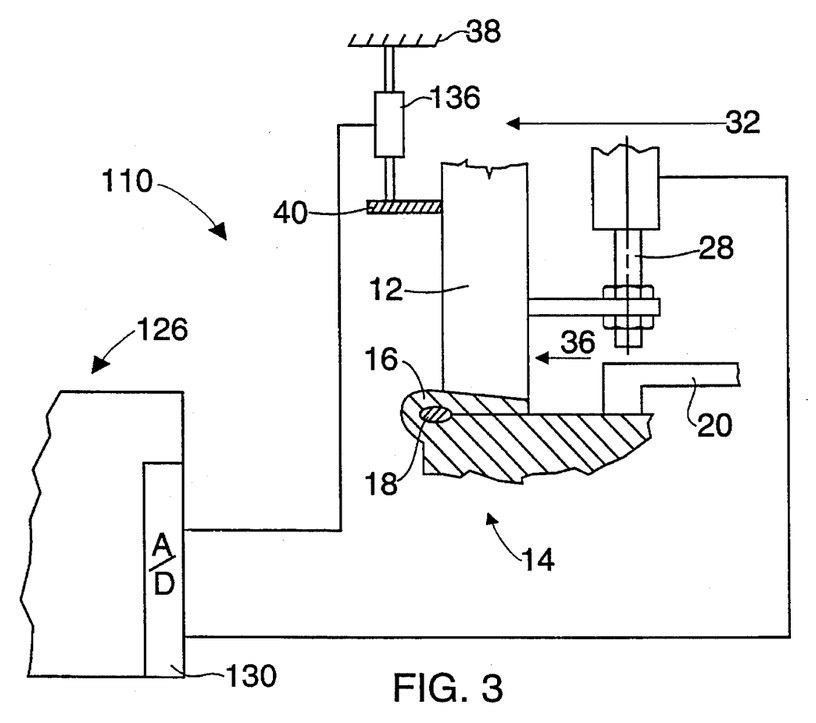
FIG. 3 is a schematic block diagram of an alternate embodiment of the present invention.

FIG. 3 shows a schematic block diagram of detection circuit 110, an alternate embodiment of the present invention. In FIG. 3, detection circuit 110 is used to detect and identify when fusing electrode 12 has become attached to fused electrical conductors 14, which includes commutator tang 16 and wire 18. The fusing operation may be performed as described above with regard to FIG. 1. In contrast to detection circuit 10, which utilized electrical potential to determine whether electrode attachment has occurred, detection circuit 110 is based on pressure or stress differential.

The fusing mechanism is mounted to housing 38, which also includes return drive 40. Return drive 40, which may be the same mechanism that drives electrode 12 during fusing, is conventionally linked to electrode 12 in order to retract electrode 12 in a controlled manner after fusing. A pressure transducer 136, which monitors the force required to retract electrode 12 from the electrical conductors 14, is conventionally mounted between housing 38 and return drive 40 in order to monitor stress during electrode withdrawal. Alternatively, a conventional stress gauge (not shown) may be mounted directly to electrode 12 to monitor stress during retraction, but the stress gauge must be able to withstand the heat generated by electrode 12 during fusing. Pressure transducer 136 is electrically connected to control system 126 via conventional means, such as analog-to-digital card 130. Position transducer 28 may also be connected to control system 126 via the same card 130, or by other conventional means. The operation of the overall pressure sensing system will be apparent from the description of FIG. 4.

Figure 4:
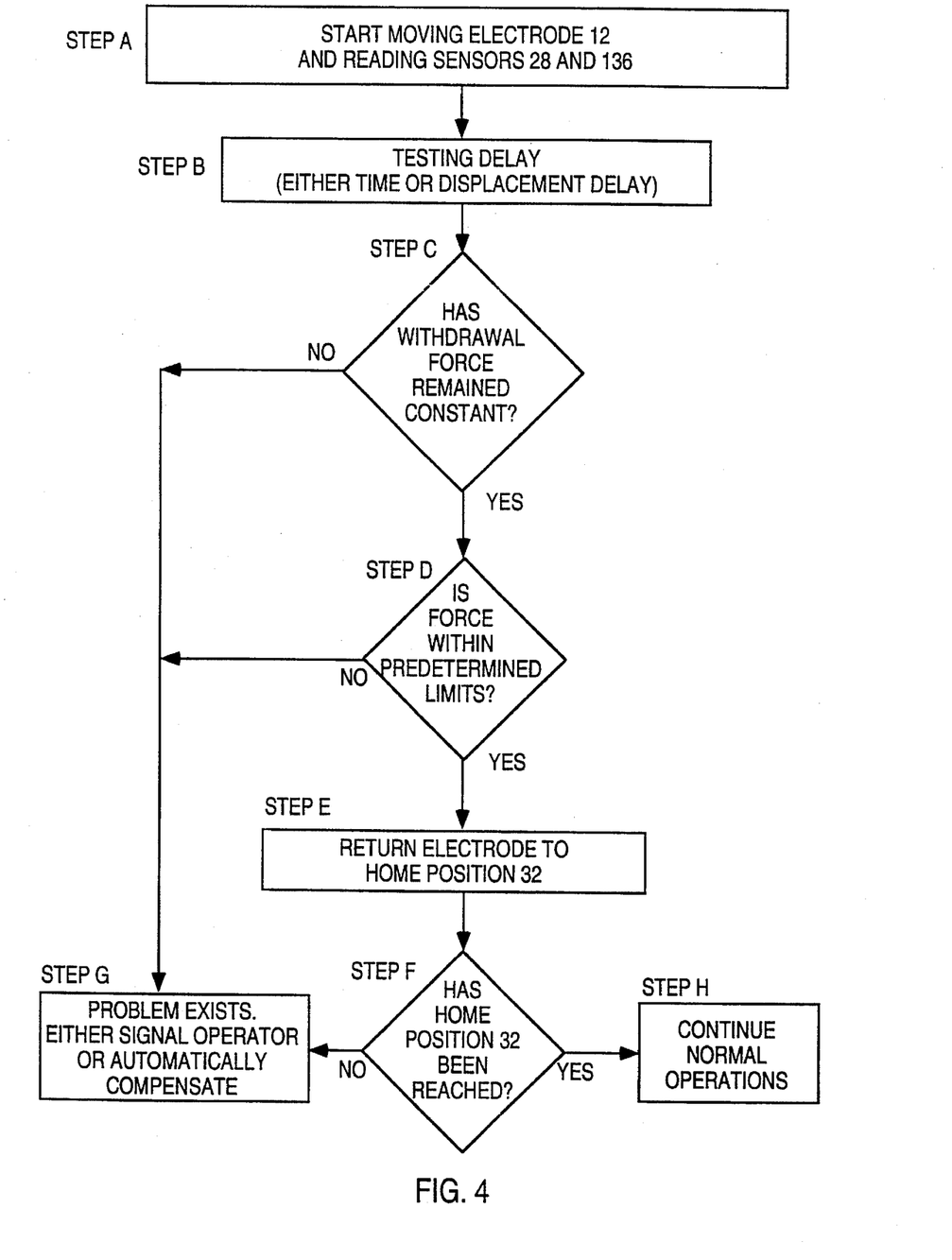
FIG. 4 is a block diagram showing the sequence of operations for the embodiment of the present invention shown in FIG. 3.

FIG. 4 is a block diagram showing a representative example of the control steps required for detection of electrode attachment using the apparatus described in FIG. 3. Once control circuit 126 has determined that the fusing of electrical conductors 14 is complete, control system 126 begins the conventional sequence required to move electrode 12 to home position 32, and at the same time, begins reading position transducer 28 and pressure transducer 136 (step A). A delay sequence, similar to the delay sequence of step E in FIG. 2, is used to at least ensure that electrode 12 has moved to testing position 36. The delay sequence may also account for deformation release of conductors 14, or other parameters, as previously described.

Once the delay sequence is complete, control system 126 determines whether the withdrawal force has remained constant during movement of electrode 12 (step C). If the withdrawal force has not remained constant, electrode 12 must have been attached to conductors 14, therefore control is transferred to the problem resolution sequence (step G). If the withdrawal force has remained constant, an additional test is performed to ensure that the measured force falls within predetermined limits (step D). If the force is not within the limits, electrode 12 must still be attached to conductors 14 and control is transferred to problem resolution (step G). If the force is within limits, no attachment has occurred and control system 126 completes the sequence to return electrode 12 to home position 32 (step E). Control system then compares the value of position transducer 28 to home position 32 to ensure that home position 32 has been reached (step F). If home position 32 is reached, normal operations may continue with the next workpiece (step H), otherwise control is transferred to problem resolution (step G).

As in detection system 10, detection system 110 operates in a manner to recognize essentially instantaneous changes in stress measurements because such changes fall within the interrupt limits of control system 126. As previously described for FIG. 2, it is essential to deal with electrode attachment as soon as possible to prevent damage to the cohesion joint that was formed during fusing. Accordingly, problem resolution may be accomplished in the same manner as described above.

It is also important to note that either embodiment of the detection system of the present invention will require tailoring for each individual type of workpiece that is being fused. This involves establishing various parameters that are the basis for electrode attachment detection and overall system timing. This tailoring may be accomplished by performing preliminary testing on individual workpieces in order to calibrate the detection system for the particular fusing conditions which apply. In addition, either embodiment of the present invention may be used to detect attachment irrespective of the heat source utilized for the fusing operations.

It will be understood that the foregoing is merely illustrative of the principles of this invention, and that various modifications can be made by those skilled in the art without departing from the scope and spirit of the invention. For example, for increased accuracy in identifying electrode attachment, a fusing machine may be designed which incorporates the features of the electrical detection circuit and the pressure transducing circuit.

The invention claimed is:

1. Apparatus for forming a fixed electrical connection in an electrically conductive workpiece by fusing together a plurality of electrically conductive materials, said apparatus comprising:

a fusing electrode;

first means for moving said electrode relative to said workpiece in order to cause said electrode to contact and apply force to said workpiece thereby deforming said workpiece;

second means for passing an electric current through said electrode and said workpiece while said electrode is in contact with said workpiece so that said electrical current heats said electrode and said electrode heats said workpiece;

third means for moving said electrode relative to said workpiece in order to separate said electrode from said workpiece after said first and second means have performed their functions; and fourth means operative during operation of said third means for detecting electrode separation by continuously monitoring and detecting the force required to separate said electrode from said workpiece.

2. The apparatus defined in claim 1, wherein said third means pulls said electrode away from said workpiece, and wherein said means for continuously monitoring and detecting force comprises:

means for detecting tensions stress in said electrode.

3. The apparatus defined in claim 1 further comprising:

means responsive to said means for continuously monitoring and detecting force for determining if force varies while said third means moves said electrode in order to separate said electrode from said workpiece, thereby indicating attachment of said electrode to said workpiece.

4. The apparatus defined in claim 3 wherein said means responsive to said means for detecting further comprises:

means for determining if said force is within a predetermined range if the force does not vary while said third means for moving is moving said fusing member.

5. Apparatus for forming a fixed electrical connection in an electrically conductive workpiece by fusing together a plurality of electrically conductive materials, said apparatus comprising:

a fusing electrode;

first means for moving said electrode relative to said workpiece in order to cause said electrode to contact and apply force to said workpiece thereby deforming said workpiece;

second means for passing an electric fusing current through said electrode and said workpiece while said electrode is in contact with said workpiece so that said electrical fusing current heats said electrode and said electrode heats said workpiece;

third means for moving said electrode relative to said workpiece in order to separate said electrode from said workpiece after said first and second means have performed their functions;

fourth means operative during operation of said third means for detecting electrode separation by continuously monitoring and detecting an electrical current in series through said electrode and said workpiece;

fifth means for passing said electrical current in series through said electrode and said workpiece during operation of said third means; and sixth means for detecting when, during operation of said third means, the electrical current from said fifth means ceases to flow through said electrode and said workpiece.

6. The apparatus defined in claim 5 further comprising:

means responsive to said sixth means for indicating that said electrode has not satisfactorily separated from said workpiece if said sixth means does not indicate that the current from said fifth means has ceased to flow by a predetermined point during operation of third means.

7. The apparatus defined in claim 5, wherein said sixth means comprises:

means for detecting the position of said electrode relative to said workpiece during operation of said third means; and means responsive to said means for detecting position for identifying the position of said electrode relative to said workpiece when the current from said fifth means ceases to flow through said electrode and said workpiece.

8. The apparatus defined in claim 7 further comprising:

means responsive to said means for identifying position for indicating that said electrode has not satisfactorily separated from said workpiece if the position identified by said means for identifying position is not substantially equal to a predetermined position.

9. Apparatus for identifying the occurrence of fusing electrode attachment during fusing operations, said apparatus comprising:

a fusing electrode, moveable between a home position and an extended position;

a grounding electrode;

means for moving said fusing electrode relative to a plurality of conductors in accordance with predetermined movement parameters from said home position to said extended position in order to cause said fusing electrode to contact and apply force to said plurality of conductors thereby deforming said plurality of conductors;

means for heating said fusing electrode in order to heat said plurality of electrical conductors; and means for detecting attachment of said fusing electrode to said plurality of conductors as a result of said application of force and heat by continuously monitoring an electrical signal through said fusing electrode and said grounding electrode, wherein said means for detecting comprises:

means for applying said electrical signal between said fusing electrode and said grounding electrode; and means for determining whether said electrical signal is being conducted from said fusing electrode, through said plurality of conductors, to said grounding electrode.

10. The apparatus defined in claim 9, wherein said means for applying an electrical signal comprises:

a predetermined voltage source;

a switch having an input connected to said voltage source, an output connected to said fusing electrode, and a control input; and a control signal for controlling said switch, said control signal being coupled to said control input of said switch.

11. The apparatus defined in claim 9, wherein said means for detecting further comprises:

a control system for monitoring said electrical signal, said control system being coupled to said fusing electrode and said grounding electrode, said control system determining that electrode attachment has occurred if:

said electrical signal remains constant while said fusing electrode is returned to said home position, thereby signifying electrode attachment; or said electrical signal varies after a predetermined compensation period while said fusing electrode is returned to said home position, thereby identifying temporary electrode attachment.

12. The apparatus defined in claim 11, wherein said control system comprises means for modifying said movement parameters in response to the identification of electrode attachment.

13. The apparatus defined in claim 11, wherein said control system comprises means for modifying said regulation parameters in response to the identification of electrode attachment.

14. The apparatus defined in claim 11, wherein said control system comprises means for automatically rejecting said plurality of conductors in response to the identification of electrode attachment.

15. The apparatus defined in claim 11, wherein said control system comprises means for automatically identifying a fusing electrode for which electrode attachment has occurred a predetermined number of times, thereby signifying that said fusing electrode should be replaced.

16. The apparatus defined in claim 11, wherein said means for detecting further comprises:

a position transducer for generating a signal corresponding to the position of said fusing electrode, said position transducer having an output, said control system being coupled to said output of said position transducer in order to determine if said fusing electrode has returned to said home position.

17. The apparatus defined in claim 9 wherein said electrical signal comprises:

a current flowing between said fusing electrode and said ground electrode; and wherein said means for determining comprises means for detecting when said current ceases to flow between said fusing electrode and said grounding electrode.

18. The apparatus defined in claim 9 wherein said means for heating comprises:

means for regulating a flow of current through said plurality of conductors in accordance with predetermined regulation parameters from said fusing electrode to said grounding electrode to generate heat in said fusing electrode.

19. Apparatus for identifying the occurrence of fusing electrode attachment during fusing operations, said apparatus comprising:

a fusing electrode, moveable between a home position and an extended position;

a grounding electrode;

means for moving said fusing electrode relative to a plurality of conductors in accordance with predetermined movement parameters from said home position to said extended position in order to cause said fusing electrode to contact and apply force to said plurality of conductors thereby deforming said plurality of conductors;

means for heating said fusing electrode in order to heat said plurality of electrical conductors; and means for detecting attachment of said fusing electrode to said plurality of conductors as a result of said application of force and heat by continuously monitoring force required to withdraw said fusing electrode to said home position in order to detect attachment of said fusing electrode to said plurality of conductors.

20. The apparatus defined in claim 19 wherein said means for heating comprises:

means for regulating a flow of current through said plurality of conductors in accordance with predetermined regulation parameters from said fusing electrode to said grounding electrode to generate heat in said fusing electrode.

21. Apparatus for identifying the occurrence of fusing electrode attachment during fusing operations, said apparatus comprising:

a fusing electrode, moveable between a home position and an extended position;

a grounding electrode;

means for moving said fusing electrode relative to a plurality of conductors in accordance with predetermined movement parameters from said home position to said extended position in order to cause said fusing electrode to contact and apply force to said plurality of conductors thereby deforming said plurality of conductors;

means for heating said fusing electrode in order to heat said plurality of electrical conductors; and means for detecting attachment of said fusing electrode to said plurality of conductors as a result of said application of force and heat by continuously monitoring a signal corresponding to current pressure required to withdraw said fusing electrode, wherein said means for detecting comprises:

a pressure transducer for generating said signal corresponding to current pressure required to withdraw said fusing electrode, said pressure transducer having an output; and a control system for continuously monitoring said pressure transducer signal, said control system being coupled to said output of said pressure transducer, said control system determining that electrode attachment has occurred if:

said pressure transducer signal varies while said fusing electrode is returned to said home position, thereby signifying temporary electrode attachment; or said pressure transducer signal remains constant, but is not within predetermined limits, while said fusing electrode is returned to said home position, thereby identifying electrode attachment.

22. The apparatus defined in claim 21, wherein said control system comprises means for modifying said movement parameters in response to the identification of electrode attachment.

23. The apparatus defined in claim 21, wherein said control system comprises means for modifying said regulation parameters in response to the identification of electrode attachment.

24. The apparatus defined in claim 21, wherein said control system comprises means for automatically rejecting said plurality of conductors in response to the identification of electrode attachment.

25. The apparatus defined in claim 21, wherein said control system comprises means for automatically identifying a fusing electrode for which electrode attachment has occurred a predetermined number of times, thereby signifying that said fusing electrode should be replaced.

26. The apparatus defined in claim 21 wherein said means for heating comprises:

means for regulating a flow of current through said plurality of conductors in accordance with predetermined regulation parameters from said fusing electrode to said grounding electrode to generate heat in said fusing electrode.

27. A method for identifying the occurrence of fusing electrode attachment during fusing operations, the method comprising the steps of:

moving a fusing electrode relative to a plurality of conductors in accordance with predetermined movement parameters from a home position to an extended position in order to cause said fusing electrode to contact and apply force to said plurality of conductors thereby deforming said plurality of conductors;

regulating a flow of current through said plurality of conductors in accordance with predetermined regulation parameters from said fusing electrode to a ground electrode to generate heat in said fusing electrode; and detecting attachment of said fusing electrode to said plurality of conductors as a result of said application of force and said flow of current by continuously monitoring an electrical signal between said fusing electrode and ground electrode, wherein said step of detecting comprises the steps of:

applying said electrical signal between said fusing electrode and a ground electrode; and monitoring said applied electrical signal to determine whether said applied signal is being conducted from said fusing electrode through said plurality of conductors to said grounding electrode.

28. The method defined in claim 27, wherein said step of applying an electrical signal comprises the steps of:

conducting said electrical signal from a predetermined voltage source to a switch; and controlling said switch such that said switch only conducts said electrical signal after said steps of moving and regulating have been completed.

29. The method defined in claim 28, wherein said step of controlling comprises the steps of:

activating said switch such that said switch conducts said electrical signal;

monitoring said movement of said fusing electrode for positional status;

monitoring said applied electrical signal in order to determine whether said electrical signal remains constant while said fusing electrode is returned to said home position, such that if:

said electrical signal remains constant electrode attachment has been identified; or said electrical signal varies after a predetermined compensation period while said fusing electrode is returned to said home position, temporary electrode attachment has been identified.

30. The method defined in claim 29 further comprising the step of modifying said movement parameters in response to the identification of electrode attachment.

31. The method defined in claim 29 further comprising the step of modifying said regulation parameters in response to the identification of electrode attachment.

32. The method defined in claim 29 further comprising the step of automatically rejecting said plurality of conductors in response to the identification of electrode attachment.

33. The method defined in claim 29 further comprising the step of automatically identifying a fusing electrode for which electrode attachment has occurred a predetermined number of times, thereby signifying that said fusing electrode should be replaced.

34. The method defined in claim 27, wherein said step of determining comprises the steps of:

monitoring said movement of said fusing electrode for positional status;

continuously monitoring the force required to return said fusing electrode to said home position; and continuously analyzing said monitored force to determine that electrode attachment has occurred if:

said monitored force varies while said fusing electrode returns to said home position, thereby signifying at least temporary electrode attachment; or said monitored force remains constant, but not within predetermined limits while said fusing electrode returns to said home position, thereby signifying electrode attachment.

35. The method defined in claim 34 further comprising the step of modifying said movement parameters in response to the identification of electrode attachment.

36. The method defined in claim 34 further comprising the step of modifying said regulation parameters in response to the identification of electrode attachment.

37. The method defined in claim 34 further comprising the step of automatically rejecting said plurality of conductors in response to the identification of electrode attachment.

38. The method defined in claim 34 further comprising the step of automatically identifying a fusing electrode for which electrode attachment has occurred a predetermined number of times, thereby signifying that said fusing electrode should be replaced.

39. The method defined in claim 27 wherein the step of monitoring said applied electrical signal comprises the steps of:

determining if said applied electrical signal remains constant while said fusing electrode is returned to said home position, thereby indicating electrode attachment; or determining if said applied electrical signal varies after a predetermined compensation period while said fusing electrode is returned to said home position, thereby indicating temporary electrode attachment.

40. The method of forming a fixed electrical connection in an electrically conductive workpiece comprising the steps of:

moving a fusing electrode relative to said workpiece in order to cause said electrode to contact and apply force to said workpiece thereby deforming said workpiece;

passing an electric current through said electrode and said workpiece while said electrode is in contact with said workpiece so that said electrical current heats said electrode and said electrode heats said workpiece;

after said moving and said passing steps have been completed, withdrawing said electrode relative to said workpiece in order to separate said electrode from said workpiece; and continuously monitoring the force required to separate said electrode from said workpiece at the same time as said withdrawing step is being performed in order to detect electrode attachment to said workpiece in order to detect any changes in the force during the step of withdrawing said electrode relative to said workpiece.

41. The method of forming a fixed electrical connection in an electrically conductive workpiece comprising the steps of:

moving a fusing electrode relative to said workpiece in order to cause said electrode to contact and apply force to said workpiece thereby deforming said workpiece;

passing an electric current through said electrode and said workpiece while said electrode is in contact with said workpiece so that said electrical current heats said electrode and said electrode heats said workpiece;

after said moving and said passing steps have been completed, withdrawing said electrode relative to said workpiece in order to separate said electrode from said workpiece; and continuously detecting a signal current in series through said electrode and said workpiece at the same time as said withdrawing step is being performed in order to detect electrode attachment to said workpiece, wherein said step of continuously detecting comprises the steps of:

passing said signal current in series through said electrode and said workpiece; and monitoring said signal current to determine when said signal current ceases to flow through said electrode and said workpiece.

42. Apparatus for forming a fixed electrical connection in an electrically conductive workpiece by fusing together a plurality of electrically conductive materials, said apparatus comprising:

a fusing electrode;

first means for moving said electrode relative to said workpiece in order to cause said electrode to contact and apply force to said workpiece thereby deforming said workpiece;

second means for passing an electric current through said electrode and said workpiece while said electrode is in contact with said workpiece so that said electrical current heats said electrode and said electrode heats said workpiece;

third means for moving said electrode relative to said workpiece in order to separate said electrode from said workpiece after said first and second means have performed their functions;

fourth means for passing an electrical current in series through said electrode and said workpiece during operation of said third means; and fifth means for detecting when, during operation of said third means, the current from said fourth means ceases to flow through said electrode and said workpiece.

43. The apparatus defined in claim 42 further comprising:

means responsive to said fifth means for indicating that said electrode has not satisfactorily separated from said workpiece if said fifth means does not indicate that the current from said fourth means has ceased to flow by a predetermined point during operation of third means.

44. The apparatus defined in claim 43, wherein said means responsive to said fifth means indicates that said electrode has not satisfactorily separated from said workpiece by producing an alarm signal.

45. The apparatus defined in claim 43, wherein said means responsive to said fifth means indicates that said electrode has not satisfactorily separated from said workpiece by automatically rejecting said workpiece.

46. The apparatus defined in claim 42, wherein said fifth means comprises:

means for detecting the position of said electrode relative to said workpiece during operation of said third means; and means responsive to said means for detecting position for identifying the position of said electrode relative to said workpiece when the current from said fourth means ceases to flow through said electrode and said workpiece.

47. The apparatus defined in claim 46 further comprising:

means responsive to said means for identifying position for indicating that said electrode has not satisfactorily separated from said workpiece if the position identified by said means for identifying position is not substantially equal to a predetermined position.

48. A method for identifying the occurrence of fusing electrode attachment during fusing operations, the method comprising the steps of:

moving a fusing electrode relative to a plurality of conductors in accordance with predetermined movement parameters from a home position to an extended position in order to cause said fusing electrode to contact and apply force to said plurality of conductors thereby deforming said plurality of conductors;

regulating a flow of current through said plurality of conductors in accordance with predetermined regulation parameters from said fusing electrode to a ground electrode to generate heat in said fusing electrode;

withdrawing said fusing electrode to said home position;

applying an electrical signal in series through said fusing electrode and said workpiece during said step of withdrawing; and monitoring said applied electrical signal to determine when said applied signal stops being conducted, thereby indicating that said electrode is separated from said workpiece.

49. The method defined in claim 48, wherein said step of applying an electrical signal comprises the steps of:
   conducting said electrical signal from a predetermined voltage source to a switch; and
   controlling said switch such that said switch only conducts said electrical signal after said steps of moving and regulating have been completed.

50. The method defined in claim 49, wherein said step of controlling comprises the steps of:
   activating said switch such that said switch conducts said electrical signal;
   monitoring said movement of said fusing electrode for positional status;
   monitoring said applied electrical signal in order to determine whether said electrical signal remains constant while said fusing electrode is returned to said home position, such that if:
   said electrical signal remains constant electrode attachment has been identified; or
   said electrical signal varies after a predetermined compensation period while said fusing electrode is returned to said home position, temporary electrode attachment has been identified.

51. The method defined in claim 50 further comprising the step of modifying said movement parameters in response to the identification of electrode attachment.

52. The method defined in claim 50 further comprising the step of modifying said regulation parameters in response to the identification of electrode attachment.

53. The method defined in claim 50 further comprising the step of automatically rejecting said plurality of conductors in response to the identification of electrode attachment.

54. The method defined in claim 50 further comprising the step of automatically identifying a fusing electrode for which electrode attachment has occurred a predetermined number of times, thereby signifying that said fusing electrode should be replaced.

55. The method defined in claim 50 further comprising the step of producing an alarm signal in response to the identification of electrode attachment.

56. The method of forming a fixed electrical connection in an electrically conductive workpiece comprising the steps of:
   moving a fusing electrode relative to said workpiece in order to cause said electrode to contact and apply force to said workpiece;
   passing an electric current through said electrode and said workpiece while said electrode is in contact with said workpiece so that said electrical current heats said electrode and said electrode heats said workpiece;
   after said moving and said passing steps have been completed, withdrawing said electrode relative to said workpiece in order to separate said electrode from said workpiece;
   passing a signal current in series through said electrode and said workpiece during said step of withdrawing; and
   monitoring said signal current to determine when said signal current ceases to flow through said electrode and said workpiece, thereby indicating that said electrode is separated from said workpiece.

57. The method defined in claim 56 further comprising the steps of:
   determining whether said electrode and said workpiece had become attached based on relative displacement of said electrode to said Workpiece when said signal current ceases to flow; and
   producing an alarm signal if said electrode and said workpiece had become attached.

58. Apparatus for fusing a commutator bar to at least one lead wire to secure said lead wire to said commutator bar, said apparatus comprising:
   a deforming member for applying force to said commutator bar in order to deform said commutator bar around said at least one wire;
   heat application means for applying heat to said commutator bar and said at least one wire at predetermined phases in conjunction with said deforming member in order to fuse said commutator bar and said at least one wire;
   return drive means for moving said deforming member relative to said at least one wire in order to separate said deforming member from said at least one wire and said commutator bar after said commutator bar and said wire have been fused; and
   detection means operative during operation of said return drive means for detecting separation of said deforming member from said at least one wire and said commutator bar by continuously monitoring and detecting the force required to separate said deforming member from said at least one wire.

59. The apparatus defined in claim 58, wherein said return drive means pulls said deforming member away from said at least one wire and said commutator bar, and wherein said detecting means comprises:
   means for detecting tension stress in said deforming member.

60. The apparatus defined in claim 59 further comprising:
   means responsive to said detecting means for determining if force varies while said third means moves said electrode in order to separate said electrode from said workpiece, thereby indicating attachment of said electrode to said workpiece.

61. Apparatus for fusing a commutator bar to at least one lead wire to secure said lead wire to said commutator bar, said apparatus comprising:
   a deforming member for applying force to said commutator bar in order to deform said commutator bar around said at least one wire;
   heat application means for applying heat to said commutator bar and said at least one wire at predetermined phases in conjunction with said deforming member in order to fuse said commutator bar and said at least one wire;
   return drive means for moving said deforming member relative to said at least one wire and said commutator bar in order to separate said deforming member from said at least one wire and said commutator bar after said commutator bar and said wire have been fused;
   means for passing an electrical current in series through said deforming member and said at least one wire and said commutator bar workpiece during operation of said return drive means; and
   means for detecting when, during operation of said return drive means, the current from said means for passing an electrical current ceases to flow through said deforming member and said at least one wire and said commutator bar.

62. The apparatus defined in claim 61 further comprising:

means responsive to said means for detecting for indicating that said deforming member has not satisfactorily separated from said at least one wire and said commutator bar if said means for detecting does not indicate that the current from said means for passing electrical current has ceased to flow by a predetermined point during operation of return drive means.

63. The apparatus defined in claim 61, wherein said means for detecting comprises:

means for detecting the position of said deforming member relative to said at least one wire and said commutator bar during operation of said return drive means; and means responsive to said means for detecting position for identifying the position of said deforming member relative to said at least one wire and said commutator bar when the current from said means for passing electrical current ceases to flow through said deforming member and said at least one wire and said commutator bar.

64. The apparatus defined in claim 63 further comprising:

means responsive to said means for identifying position for indicating that said deforming member has not satisfactorily separated from said at least one wire and said commutator bar if the position identified by said means for identifying position is not substantially equal to a predetermined position.

65. Apparatus for fusing a terminal bar hook to at least one lead wire to secure said lead wire to said terminal bar hook, said apparatus comprising:

a deforming member for applying force to said terminal bar hook in order to deform said terminal bar hook around said at least one wire;

heat application means for applying heat to said terminal bar hook and said at least one wire at predetermined phases in conjunction with said deforming member in order to fuse said terminal bar hook and said at least one wire;

return drive means for moving said deforming member relative to said at least one wire and said terminal bar hook in order to separate said deforming member from said at least one wire and said terminal bar hook after said terminal bar hook and said at least one wire have been fused; and detection means operative during operation of said return drive means for detecting separation of said deforming member from said at least one wire and said terminal bar hook by continuously monitoring and detecting the force required to separate said deforming member from said at least one wire.

66. The apparatus defined in claim 65, wherein said return drive means pulls said deforming member away from said at least one wire and said terminal bar hook, and wherein said detecting means comprises:

means for detecting tension stress in said deforming member.

67. The apparatus defined in claim 66 further comprising:

means responsive to said detecting means for determining if force varies while said third means moves said electrode in order to separate said electrode from said workpiece, thereby indicating attachment of said electrode to said workpiece.

68. Apparatus for fusing a terminal bar hook to at least one lead wire to secure said lead wire to said terminal bar hook, said apparatus comprising:

a deforming member for applying force to said terminal bar hook in order to deform said terminal bar hook around said at least one wire;

heat application means for applying heat to said terminal bar hook and said at least one wire at predetermined phases in conjunction with said deforming member in order to fuse said terminal bar hook and said at least one wire;

return drive means for moving said deforming member relative to said at least one wire and said terminal bar hook in order to separate said deforming member from said at least one wire and said terminal bar hook after said terminal bar hook and said wire have been fused;

means for passing an electrical current in series through said deforming member and said at least one wire and said terminal bar hook workpiece during operation of said return drive means; and means for detecting when, during operation of said return drive means, the current from said means for passing an electrical current ceases to flow through said deforming member and said at least one wire and said terminal bar hook.

69. The apparatus defined in claim 68 further comprising:

means responsive to said means for detecting for indicating that said deforming member has not satisfactorily separated from said at least one wire and said terminal bar hook if said means for detecting does not indicate that the current from said means for passing electrical current has ceased to flow by a predetermined point during operation of return drive means.

70. The apparatus defined in claim 68, wherein said means for detecting comprises:

means for detecting the position of said deforming member relative to said at least one wire and said terminal bar hook during operation of said return drive means; and means responsive to said means for detecting position for identifying the position of said deforming member relative to said at least one wire and said terminal bar hook when the current from said means for passing electrical current ceases to flow through said deforming member and said at least one wire and said terminal bar hook.

71. The apparatus defined in claim 70 further comprising:

means responsive to said means for identifying position for indicating that said deforming member has not satisfactorily separated from said at least one wire and said terminal bar hook if the position identified by said means for identifying position is not substantially equal to a predetermined position.

* * * * *